United States Patent
Lozhkin et al.

(10) Patent No.: US 12,418,316 B2
(45) Date of Patent: Sep. 16, 2025

(54) ARRAY ANTENNA SYSTEM AND NONLINEAR DISTORTION SUPPRESSION METHOD

(71) Applicant: Fujitsu Limited, Kawasaki (JP)

(72) Inventors: Alexander Nikolaevich Lozhkin, Kawasaki (JP); Tomoya Ota, Kawasaki (JP); Yoji Ohashi, Fucyu (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 18/366,512

(22) Filed: Aug. 7, 2023

(65) Prior Publication Data

US 2024/0154635 A1    May 9, 2024

(30) Foreign Application Priority Data

Nov. 9, 2022    (JP) ................... 2022-179683

(51) Int. Cl.
| | | |
|---|---|---|
| *H04B 1/04* | (2006.01) | |
| *H01Q 3/36* | (2006.01) | |
| *H04B 1/62* | (2006.01) | |
| *H04B 7/06* | (2006.01) | |

(52) U.S. Cl.
CPC ............ *H04B 1/0475* (2013.01); *H01Q 3/36* (2013.01); *H04B 1/0483* (2013.01); *H04B 1/62* (2013.01); *H04B 7/068* (2013.01); *H04B 7/0682* (2013.01); *H04B 2001/0425* (2013.01)

(58) Field of Classification Search
CPC .... H04B 1/005; H04B 1/0064; H04B 1/0458; H04B 1/0475; H04B 1/0483; H04B 1/38; H04B 1/40; H04B 1/62; H04B 7/01; H04B 7/04; H04B 7/0404; H04B 7/068; H04B 7/0682; H04B 2001/0408; H04B 2001/0425; H01Q 3/36
USPC ....... 375/219, 259, 260, 267, 296, 297, 299; 370/278, 334; 455/88, 103, 114.3, 553.1
See application file for complete search history.

(56) References Cited

U.S. PATENT DOCUMENTS

| | | | |
|---|---|---|---|
| 2014/0292579 A1* | 10/2014 | Oh ........................... | H01Q 3/38 342/372 |
| 2017/0371102 A1 | 12/2017 | Painchaud et al. | |
| 2018/0053997 A1* | 2/2018 | Noto ...................... | H04B 1/0475 |

(Continued)

FOREIGN PATENT DOCUMENTS

| | | |
|---|---|---|
| JP | 2015-005901 A | 1/2015 |
| JP | 2021-048503 A | 3/2021 |
| WO | WO 2021/124463 A1 | 6/2021 |

*Primary Examiner* — Young T. Tse
(74) *Attorney, Agent, or Firm* — ArentFox Schiff LLP

(57) ABSTRACT

An array antenna system includes DPD that suppresses first IMD in a first band adjacent to a band of a transmission signal, antenna elements that include a first element and a second element, phase shifters that each correspond to each of the elements and form a transmission signal directed to a predetermined direction and second IMD, by applying a weight to the signal and the second IMD in a second band adjacent to the first band, a first amplifier that amplifies the signal directed to the direction and first distortion serving as the second IMD, that are output from a first shifter of the first element, and a second amplifier that amplifies the signal directed to the direction and second distortion a phase of which is opposite to that of the first distortion serving as the second IMD, that are output from a second shifter of the second element.

6 Claims, 17 Drawing Sheets

(56) References Cited

U.S. PATENT DOCUMENTS

| | | | |
|---|---|---|---|
| 2018/0067259 A1 | 3/2018 | Teng et al. | |
| 2019/0089389 A1* | 3/2019 | Gutman | H03F 3/24 |
| 2019/0369333 A1 | 12/2019 | Testa et al. | |
| 2020/0186103 A1* | 6/2020 | Weber | H04L 27/368 |
| 2021/0091832 A1 | 3/2021 | Obiya et al. | |
| 2021/0305945 A1* | 9/2021 | Pratt | H04B 1/0475 |
| 2022/0006430 A1* | 1/2022 | Rexberg | H03F 1/3258 |
| 2022/0385313 A1* | 12/2022 | Drogi | H03F 3/245 |
| 2023/0009653 A1* | 1/2023 | Vejlgaard | H04B 7/088 |

\* cited by examiner

| m1: | m2: | m3: | m4: | m5: |
|---|---|---|---|---|
| 26.00 GHz | 24.50 GHz | 27.50 GHz | 23.00 GHz | 29.00 GHz |
| -2.6 dB | -3.5 dB | -4.2 dB | -38.5 dB | -51.4 dB |

———— INSERTION LOSS 26 GHz  ———— RETURN LOSS 26 GHz

ARRAY ANTENNA SYSTEM AND NONLINEAR DISTORTION SUPPRESSION METHOD

CROSS-REFERENCE TO RELATED APPLICATION

This application is based upon and claims the benefit of priority of the prior Japanese Patent Application No. 2022-179683, filed on Nov. 9, 2022, the entire contents of which are incorporated herein by reference.

FIELD

The embodiment discussed herein is related to an array antenna system, a nonlinear distortion suppression method, and a wireless device.

BACKGROUND

An array antenna is the primary technique for implementing high data rate in the 5th Generation (5G) millimeter wave frequency band (for example, 28 GHz band). For example, several hundreds of antenna devices are disposed in a base station of a wireless system in the 5G millimeter wave frequency band, using the available high-frequency band of the spectrum at several hundred MHz.

An array antenna in a wireless system, for example, in a radio unit (RU), is a collection of a plurality of antenna elements for electronically controlling the phase of each of the antenna elements, by arranging the antenna elements on a plane. The array antenna forms an effective radiation pattern referred to as the main lobe, when the radiation pattern of each of the antenna elements is constructively combined with the radiation pattern of the adjacent antenna element. For example, each antenna element of a Transmitter (Tx) array antenna includes a Power Amplifier (PA) and a phase shifter.

The beamforming of the Tx array antenna is a technique for transmitting radio wave energy to a specific User Equipment (UE) via a wireless channel, when transmitting Tx signals. By adjusting the phase and amplitude of the Tx signals output from the antenna elements, the Tx signals received on the UE side are coherently and constructively combined. As a result, the throughput is increased in the UE. The Tx array antenna maximizes the energy emitted in the main beam, while reducing the energy emitted in the side lobe to an acceptable level.

The PA in the Tx array antenna is a device that consumes the most electric power in the RU. Hence, it is preferable to use the PA with high electric power efficiency. When the amplification efficiency of the Radio Frequency (RF) signal is high, the PA disposed at the final stage of the RU often operates in a nonlinear region close to saturation. As a result, the Adjacent Channel Leakage Ratio (ACLR) and Error Vector Magnitude (EVM) of the Tx signal are degraded, when the RF signal passes through the nonlinear region of the PA. Thus, in the PA, by supplying electric power to the antenna element at sufficient bandwidth while ensuring high linearity, the EVM and ACLR are expected to be suppressed to a minimum.

However, the nonlinearity of the PA causes nonlinear distortion, for example, Intermodulation Distortion (IMD) in the In-Band and Out-of-Band of the 5G millimeter wave frequency band. The In-Band refers to a band of the Tx signal, and the Out-of-Band refers to an adjacent band that is adjacent to the band of the Tx signal. The Out-of-Band IMD is a wide band. For example, the Out-of-Band IMD is generated in the adjacent band the frequency band of which is seven times to nine times the band with respect to the bandwidth of the Tx signal. Therefore, the Out-of-Band IMD interferes with the Tx signals at the fundamental frequency of other carriers assigned to adjacent bands. As a result, the Out-of-Band IMD interferes with the Tx signals used by multiple carriers, and reduces the throughput of the entire wireless system.

Thus, Digital Predistortion (DPD) is widely used in the technical field of the array antenna system to linearize the PA in the array antenna, to improve the EVM, and to improve the interference level in the adjacent band. The DPD is a technique that improves the amplification efficiency of the PA by compensating the IMD.

However, to linearize the wide-band signal in the 5G millimeter wave frequency band, wide-band DPD that operates with a high-speed clock will be needed among the DPDs. The 5G millimeter wave frequency band includes a band that is a frequency band in the Tx signal band, a first band adjacent to the band, and a second band that is separated from the band and that is adjacent to the first band. The first band is a frequency band less than three times the band. The second band is a frequency band between the frequency band three times the band and the frequency band seven times or nine times the band. For example, the wide band is the second band. With the wide-band DPD, it is possible to suppress not only the first IMD component that is the IMD component in the first band, but also seventh-order IMD or ninth-order IMD serving as the second IMD component that is the IMD component in the second band to an acceptable level. It is to be noted that the acceptable level is the level at which the IMD component to be suppressed does not affect the Tx signal or the Tx signals of other carriers.

FIG. 12 is an explanatory diagram illustrating an example of the relation of Power Spectrum Density (PSD) at each frequency band of an OFDM signal when the wide-band DPD is used. The Orthogonal Frequency-Division Multiplexing (OFDM) signal is a signal used in the 5G millimeter wave frequency band. The horizontal axis illustrated in FIG. 12 is a frequency band of the OFDM signal, and the vertical axis is the PSD. For example, the Tx signal with a bandwidth of 400 MHz in the band illustrated in FIG. 12 is an OFDM signal with the center frequency of 28 GHz. For example, the band of the Tx signal is a frequency band between 27.8 GHz and 28.2 GHZ, and has a bandwidth of 400 MHZ. For example, the frequency band of a first band (W2) is between 27.6 GHz and 27.8 GHz, and between 28.2 GHz and 28.4 GHz. Moreover, for example, the frequency band of the second band is between 27.3 GHz and 27.6 GHz, and between 28.4 GHz and 28.7 GHz. The Tx signal including an IMD component W1 generated in the PA is the component indicated by the dotted line in FIG. 12. The IMD components are included in the wide bandwidth from 27.3 GHz to 28.7 GHz.

Thus, when a wide-band DPD is used, an IMD component W2 in the first band and the second band that are Out-of-Band, can be suppressed as illustrated by the dashed line in FIG. 12 (about 10 dB). As a result, for example, when the wide-band DPD is used, it is possible to suppress the IMD component to an acceptable level in the entire frequency band between 27.3 GHz and 28.7 GHz.

However, the wide-band DPD operates with a high-speed clock, to linearize the wide-band signal in the 5G millimeter wave frequency band. Hence, the power consumption will be increased. Thus, in recent years, narrow-band DPD with low power consumption has been developed as an alternative to the wide-band DPD with high power consumption. The narrow-band DPD operates with a low-speed clock. Hence, the power consumption will be smaller than that of the wide-band DPD.

FIG. 13 is an explanatory diagram illustrating an example of an array antenna system 100. It is assumed that the array antenna system 100 is built into the RU in the wireless system for 5G millimeter frequency band. The array antenna system 100 illustrated in FIG. 13 includes a Serial (S)/Parallel (P) conversion unit 111, a narrow-band DPD 112, an Inverse Discrete Fourier Transform (IDFT) unit 113, and a Cyclic Prefix (CP) insertion unit 114. The array antenna system 100 includes an up-converter 115, a plurality of phase shifters 116, a plurality of high power amplifiers (HPAs) 117, and a plurality of antenna elements 118. The array antenna system 100 includes a coupling unit 121, a down-converter 122, an S/P conversion unit 123, a Discrete Fourier Transform (DFT) unit 124, and an update unit 125. There are N (N is an integer) pieces of the HPAs 117, N pieces of the phase shifters 116, and N pieces of the antenna elements 118.

The S/P conversion unit 111 converts serial transmission data into parallel transmission data, to map each bit of the transmission data to a subcarrier. The narrow-band DPD 112 is DPD that suppresses the first IMD component in the first band adjacent to the band of the Tx signal, on the basis of each bit of the parallel transmission data mapped by the S/P conversion unit 111.

After suppressing the first IMD component in the first band, the IDFT unit 113 converts each bit of the Tx signal in the frequency domain after the first IMD component in the first band is suppressed, into a Tx signal of an OFDM symbol. The CP insertion unit 114 copies the rear part of the Tx signal of the OFDM symbol converted by the IDFT unit 113, and inserts the CP before the OFDM symbol.

The up-converter 115 is a converter that up-converts the Tx signal of the OFDM symbol after the CP is inserted, into a high-frequency Tx signal. The phase shifter 116 is provided for each antenna element 118, and forms a Tx signal directed to a predetermined direction, by applying the weight of each antenna element 118 to the high-frequency Tx signal on which up-conversion processing is performed. The HPA 117 is an amplifier provided for each antenna element 118, and amplifies the Tx signal directed to a predetermined direction from the phase shifter 116 corresponding to the HPA 117. The antenna element 118 outputs the Tx signal directed to a predetermined direction that is amplified by the HPA 117 via an antenna.

The coupling unit 121 obtains the high-frequency Rx signal received by the antenna elements 118 or the high-frequency feedback Tx signal from the output stage of the HPA 117. The down-converter 122 down-converts the high-frequency Rx signal or feedback Tx signal obtained by the coupling unit 121. The S/P conversion unit 123 converts the serial Rx signal or feedback Tx signal on which down-conversion processing is performed into parallel. The DFT unit 124 converts the Rx signal or feedback Tx signal of the OFDM symbol converted into parallel, into the Rx signal or feedback Tx signal in the frequency domain. On the basis of the converted Rx signal or feedback Tx signal, the update unit 125 controls the narrow-band DPD 112 such that the first IMD component in the first band is suppressed to an acceptable level.

FIG. 14 is an explanatory diagram illustrating an example of a Tx signal and a second IMD component (third IMD component) in the HPA 117. The HPA 117 with N="1" illustrated in FIG. 14 outputs a Tx signal $F_1$ formed by two tone signals and two second IMD components $A_1$ adjacent to the two tone signals via the antenna element 118 with N="1". The two second IMD components A 1 are the IMD components generated in the second band. The HPA 117 with N="2" outputs two Tx signals $F_2$ and two second IMD components $A_2$ via the antenna element 118 with N="2". The two second IMD components $A_2$ are the IMD components generated in the second band. The HPA 117 with N="N" outputs two Tx signals $F_N$ and two second IMD components $A_N$ via the antenna element 118 with N="N". The two second IMD components $A_N$ are the IMD components generated in the second band. The level of each second IMD component output from each antenna element 118 is the same.

Moreover, the UE that receives the Tx signal arriving from the RU receives Tx signals $F_1, F_2, \ldots F_N$ among the signals from the antenna elements 118 in the RU, and coherently combines the Tx signals $F_1, F_2, \ldots F_N$. Hence, the level of the Tx signal is increased. Furthermore, the UE receives the second IMD components $A_1$ to $A_N$ of "1" to "N" from the antenna elements 118, and receives $A_1+A_2+\ldots A_N$, for example, $A_1 \times N$ pieces of the second IMD components. As a result, in the UE, not only the strength of the useful Tx signal to be received is increased, but also the strength of the undesirable second IMD component to be received will be increased.

That is, with the narrow-band DPD 112, although it is possible to suppress the first IMD component in the first band to an acceptable level, it is not possible to suppress the second IMD component in the second band to an acceptable level. Therefore, compared to the wide-band DPD, the bandwidth of the narrow-band DPD 112 in which the IMD component can be suppressed will be narrow. That is, the bandwidth of the narrow-band DPD 112 in which the IMD component can be suppressed, is the first band that does not exceed three times the band where the first IMD such as third-order IMD and the like is generated.

FIG. 15 is an explanatory diagram illustrating an example of the relation of PSD at each frequency band of an OFDM signal when a narrow-band DPD is used. The Tx signal including an IMD component W1 generated in the HPA 117 is the component indicated by the dotted line in FIG. 15. The IMD components are included in the wide bandwidth from 27.3 GHz to 28.7 GHz.

Thus, when the narrow-band DPD 112 is used, a first IMD component W3 in the first band is suppressed to an acceptable level as illustrated by the dashed line in FIG. 15. However, with the narrow-band DPD 112, it is not possible to suppress the second IMD component in the second band to an acceptable level. The level of the second IMD component in the second band BW3, that is not suppressed in this manner, is relatively high, and is equivalent to the PSD at the center frequency of the Tx signal (28 GHz), that is, −30 dBc. Therefore, the second IMD component in the second band interferes with the level of the Tx signals of other carriers. As a result, the throughput of the entire wireless system will be reduced.

Thus, in the array antenna system 100 using the narrow-band DPD 112, a method has been developed to suppress the second IMD component in the second band to an acceptable level, by using a Band Pass Filter (BPF). With the BPF, it is possible to suppress the second IMD component, that is a high-order IMD component of fifth-order or more in the second band (that is, the IMD component unable to be suppressed by the narrow-band DPD 112) to an acceptable level.

FIG. 16 is an explanatory diagram illustrating an example of the insertion loss of a BPF at each frequency band of a Tx signal. The horizontal axis illustrated in FIG. 16 is a frequency band of the Tx signal, and the vertical axis is the insertion loss when a BPF is implemented in the narrow-band DPD 112. The BPF for 5G millimeter wave band is large and has a high insertion loss. In FIG. 16, the insertion loss of an FR2 in the 28 GHz band is normally 3 dB or more, even at the locations indicated by the m1 and m2 markers. Hence, it is not realistic to implement a BPF for suppressing the IMD component in the frequency band far away from the frequency band of the Tx signal. The related technologies are described, for example, in: U.S. Publication No. 2018/0067259, U.S. Publication No. 2019/0369333, and U.S. Publication No. 2017/0371102.

For example, if a BPF with a high insertion loss is implemented in the array antenna system 100 for the narrow-band DPD 112, the PA efficiency will be reduced by twice. Hence, it is not possible to use such BPF in most of practical cases. Moreover, if a BPF is implemented in the array antenna system 100 for the narrow-band DPD 112, the BPF needs to be provided for each HPA 117 in the array antenna. For example, in a Printed Circuit Board (PCB) of a massive MIMO array antenna system of 5G millimeter wave, the number of the HPAs 117 exceeds 128 pieces. Hence, it is difficult to secure space for disposing the BPF in each HPA 117. Also, the BPF will be placed on the wiring on the surface of the PCB. Because the microstrip loss is proportional to the length of the microstrip, the total connection loss is increased with an increase in the space of the PCB. Therefore, a new solution to suppress the high-order IMD component has been sought after.

Therefore, for example, a technique that can suppress the second IMD component generated in the second band to an acceptable level has been sought after. For example, a technique that can suppress the second IMD component generated in the second band to an acceptable level without using a BPF is sought after.

SUMMARY

According to an aspect of an embodiment, an array antenna system includes Digital Predistortion (DPD), a plurality of antenna elements, a plurality of phase shifters, a first amplifier and a second amplifier. The DPD suppresses first nonlinear distortion in a first band adjacent to a band of a transmission signal. The plurality of antenna elements include a first antenna element and a second antenna element. The plurality of phase shifters each correspond to each of the antenna elements, and form a transmission signal directed to a predetermined direction and second nonlinear distortion, by applying a weight to the transmission signal and the second nonlinear distortion in a second band that is separated from the band and that is adjacent to the first band. The first amplifier amplifies the transmission signal directed to the predetermined direction and first distortion serving as the second nonlinear distortion, that are output from a first phase shifter corresponding to the first antenna element. The second amplifier amplifies the transmission signal directed to the predetermined direction and second distortion a phase of which is opposite to that of the first distortion serving as the second nonlinear distortion, that are output from a second phase shifter corresponding to the second antenna element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The disclosed technology is not limited to the present embodiment. Moreover, the following embodiments may be appropriately combined within a range that does not contradict each other.

Figure 1:
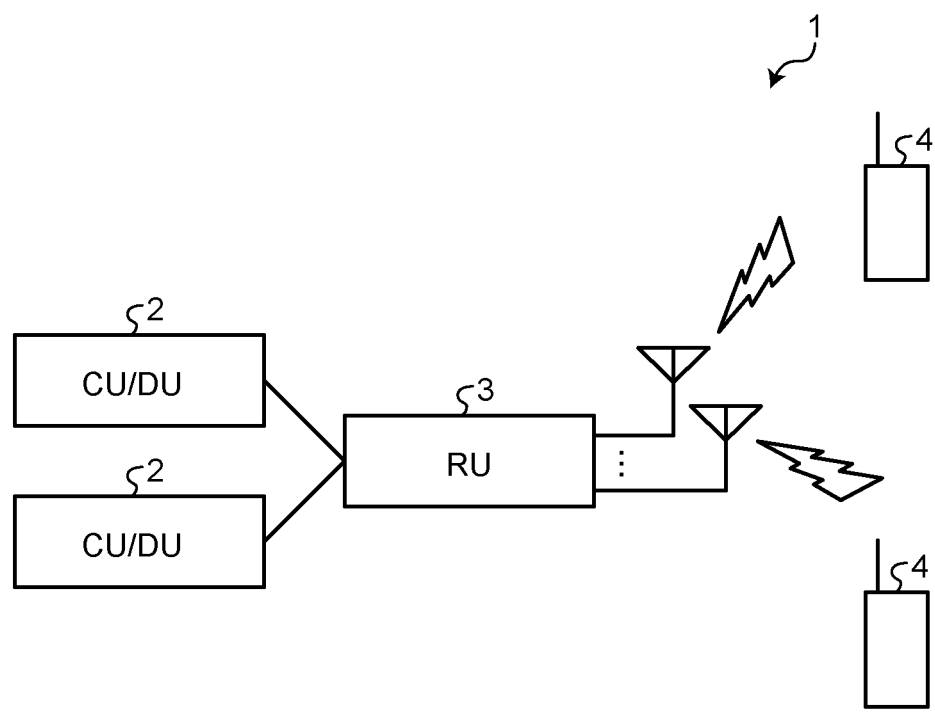
FIG. 1 is an explanatory diagram illustrating an example of a wireless system of the present embodiment.

FIG. 1 is an explanatory diagram illustrating an example of a wireless system of the present embodiment. For example, a wireless system 1 illustrated in FIG. 1 is a wireless system in the millimeter frequency band. The wireless system 1 includes a Centralized Unit (CU)/Distributed Unit (DU) 2, a Radio Unit (RU) 3, and a User Equipment (UE) 4. A Radio Access Network (RAN) interface between the RU 3 and the UE 4 is interoperable across multiple carriers. The RU 3 is an example of a wireless device. The CU/DU 2 and the RU 3 may be collectively referred to as a single wireless device.

The CU/DU 2 is connected to a core network, which is not illustrated, and performs baseband processing on data transmitted to the UE 4 and data received from the UE 4. The CU/DU 2 communicates with each UE 4 via the RU 3. The data may be data of different carriers transmitted from different CU/DUs 2, or data of the same carrier transmitted from a single CU/DU 2. Moreover, the CU/DU 2 may be a single device in which the CU and the DU are integrated, or may be multiple devices in which the CU and the DU are provided as separate units. The CU/DU 2 and the RU 3 function as base station devices in a wireless system.

The RU 3 performs RF processing on the data transmitted to the UE 4 and the data received from the UE 4. Specifically, the RU 3 receives band data with different frequency bands from the CU/DU 2, performs RF processing on the band data, and transmits the band data to the UE 4.

The RU 3 has an array antenna system including a plurality of antenna elements. The RU 3 performs a wireless communication with the UE 4, by forming a beam corresponding to the band data. In this process, the RU 3 executes distortion compensation to suppress the IMD components in the band data. That is, the RU 3 executes distortion compensation to suppress the IMD components in the signal band of the band data, and also executes distortion compensation to suppress the IMD components outside the signal band of the band data. The internal configuration of the RU 3 will be described in detail below. The UE 4 is a terminal device that performs wireless communication with the RU 3. That is, the UE 4 receives a Tx signal from the RU 3, and transmits an Rx signal to the RU 3.

Figure 2:
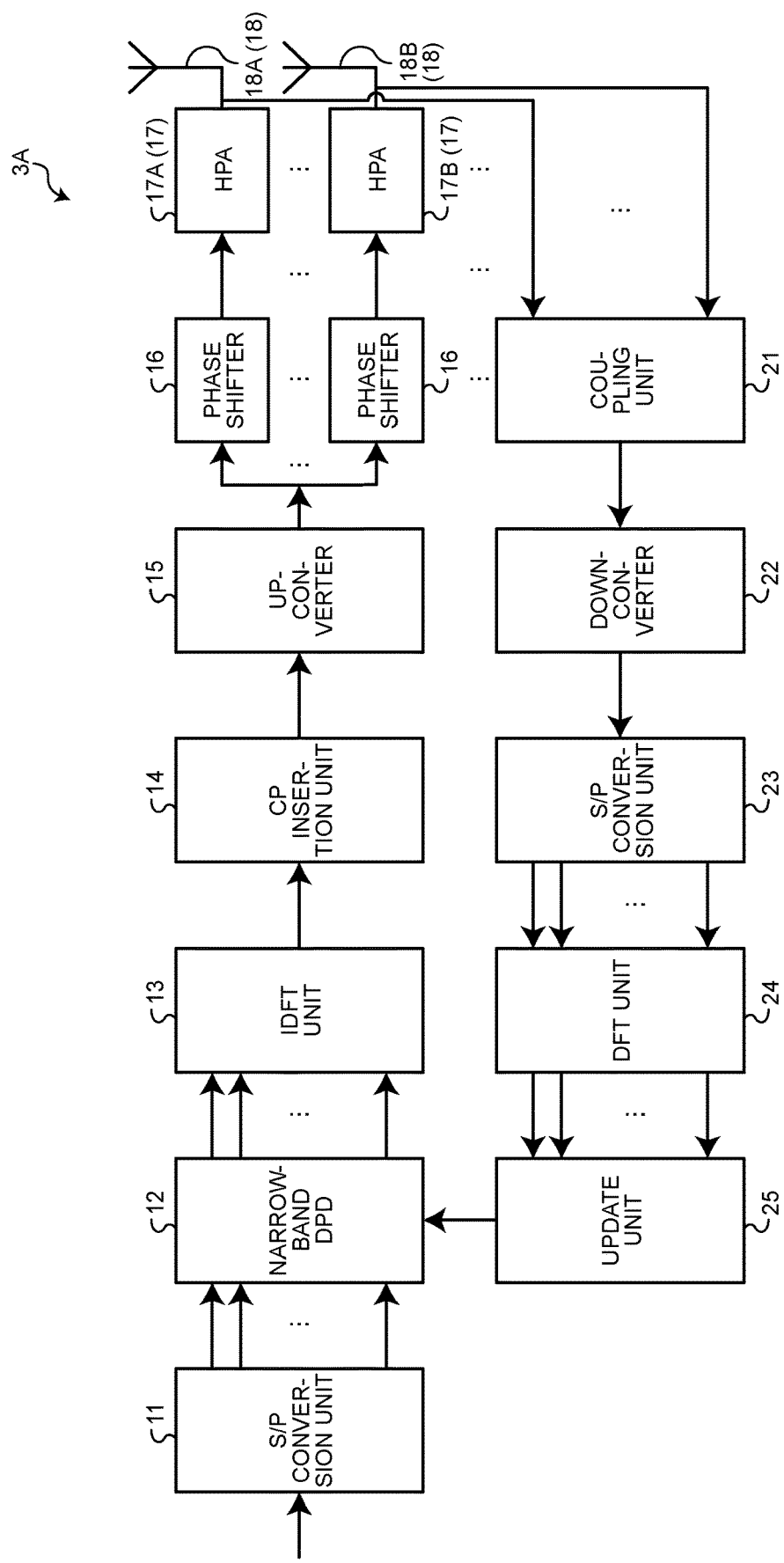
FIG. 2 is an explanatory diagram illustrating an example of an array antenna system in an RU of the present embodiment.

FIG. 2 is an explanatory diagram illustrating an example of an array antenna system 3A in the RU 3 of the present embodiment. The array antenna system 3A illustrated in FIG. 2 includes a Serial (S)/Parallel (P) conversion unit 11, a narrow-band DPD 12, an Inverse Discrete Fourier Transform (IDFT) unit 13, and a Cyclic Prefix (CP) insertion unit 14. The array antenna system 3A includes an up-converter 15, a plurality of phase shifters 16, a plurality of High Power Amplifiers (HPAs) 17, and a plurality of antenna elements 18. The array antenna system 3A includes a coupling unit 21, a down-converter 22, an S/P conversion unit 23, a Discrete Fourier Transform (DFT) unit 24, and an update unit 25. There are N (N is an integer) pieces of the HPAs 17, N pieces of the phase shifters 16, and N pieces of the antenna elements 18.

The S/P conversion unit 11 converts serial transmission data into parallel transmission data, to map each bit of the transmission data to a subcarrier. The narrow-band DPD 12 is DPD that suppresses the first IMD component in the first band adjacent to the band of the Tx signal, on the basis of each bit of the parallel transmission data mapped by the S/P conversion unit 11. With the narrow-band DPD 12, it is possible to suppress a certain amount of the second IMD component in the second band, in addition to the first IMD component in the first band. However, with the narrow-band DPD 12, it is not possible to suppress the second IMD component to an acceptable level. The band has a predetermined bandwidth. Moreover, the first band has a first bandwidth. Furthermore, the second band has a second bandwidth.

After suppressing the first IMD component in the first band, the IDFT unit 13 converts each bit of the Tx signal in the frequency domain after the first IMD component is suppressed, into a Tx signal of an OFDM symbol. The CP insertion unit 14 copies the rear part of the Tx signal of the OFDM symbol converted by the IDFT unit 13, and inserts the CP before the OFDM symbol.

The up-converter 15 is a converter that up-converts the Tx signal of the OFDM symbol after the CP insertion, into a high-frequency Tx signal. The phase shifter 16 is provided for each antenna element 18, and forms a Tx signal directed to a predetermined direction, by applying the weight of each antenna element 18 to the high-frequency Tx signal on which up-conversion processing is performed. The HPA 17 is an amplifier provided for each antenna element 18, and amplifies the Tx signal directed to a predetermined direction output from the phase shifter 16 corresponding to the HPA 17. The antenna element 18 outputs the Tx signal directed to a predetermined direction that is amplified by the HPA 17 via an antenna.

The phase shifter 16 forms the Tx signal directed to a predetermined direction and the second IMD component, by applying the weight of each antenna element 18 to the Tx signal and the second IMD component in a second band (BW3) that is separated from the band and that is adjacent to the first band. The antenna element 18 includes N pieces of first antenna elements 18A and N pieces of second antenna elements 18B. The HPA 17 includes N/2 pieces of first HPAs 17A and N/2 pieces of second HPAs 17B.

The first HPA 17A corresponding to the first antenna element 18A amplifies the Tx signal directed to a predetermined direction and the second IMD component in the second band BW3 that are output from the phase shifter 16 corresponding to the first antenna element 18A, and outputs the Tx signal and the second IMD component to the first antenna element 18A. The first HPA 17A is a first amplifier.

The second HPA 17B corresponding to the second antenna element 18B amplifies the Tx signal directed to a predetermined direction and the third IMD component the phase of which is opposite to that of the second IMD component, that are output from the phase shifter 16 corresponding to the second antenna element 18B, and outputs the Tx signal and the third IMD component to the second antenna element 18B. The second HPA is a second amplifier.

That is, the first antenna element 18A outputs the Tx signal directed to a predetermined direction and the second IMD component that are amplified by the first HPA 17A. The second antenna element 18B outputs the Tx signal directed to a predetermined direction and the opposite-phase third IMD component that are amplified by the second HPA 17B. That is, the UE 4 receives the Tx signal directed to a predetermined direction and the second IMD component from the first antenna element 18A in the RU 3, and the Tx signal directed to a predetermined direction and the opposite-phase third IMD component from the second antenna element 18B. The second IMD component is an example of a first distortion that is a second nonlinear distortion. Moreover, the third IMD component is an example of a second distortion that is a second nonlinear distortion.

Then, the UE 4 will receive the Tx signal with high strength, by coherently combining the Tx signal directed to a predetermined direction from the first antenna element 18A and the Tx signal directed to a predetermined direction from the second antenna element 18B such that the vector sum of the above two Tx signals is maximized. In contrast, the UE 4 combines the second IMD component from the first antenna element 18A and the opposite-phase third IMD component from the second antenna element 18B, and cancels out the second IMD component with the third IMD component. That is, in the UE 4, the vector sum of the second IMD component and the third IMD component becomes zero. As a result, in the UE 4, while securing the strength of the Tx signal to be received, it is possible to suppress the second IMD component to be received to an acceptable level, for example, to a zero level.

The coupling unit 21 obtains the high-frequency Rx signal received by the antenna elements 18 or the high-frequency feedback Tx signal from the output stage of the HPA 17. The down-converter 22 down-converts the high-frequency Rx signal or feedback Tx signal obtained by the coupling unit 21. The S/P conversion unit 23 converts the serial Rx signal or feedback Tx signal on which down-conversion processing is performed into parallel. The DFT unit 24 converts the Rx signal or feedback Tx signal of the OFDM symbol converted into parallel, into the Rx signal or feedback Tx signal in the frequency domain. On the basis of the converted Rx signal or feedback Tx signal, the update unit 25 controls the narrow-band DPD 12 so that the first IMD component in the first band BW2 is suppressed to an acceptable level.

Figure 3:
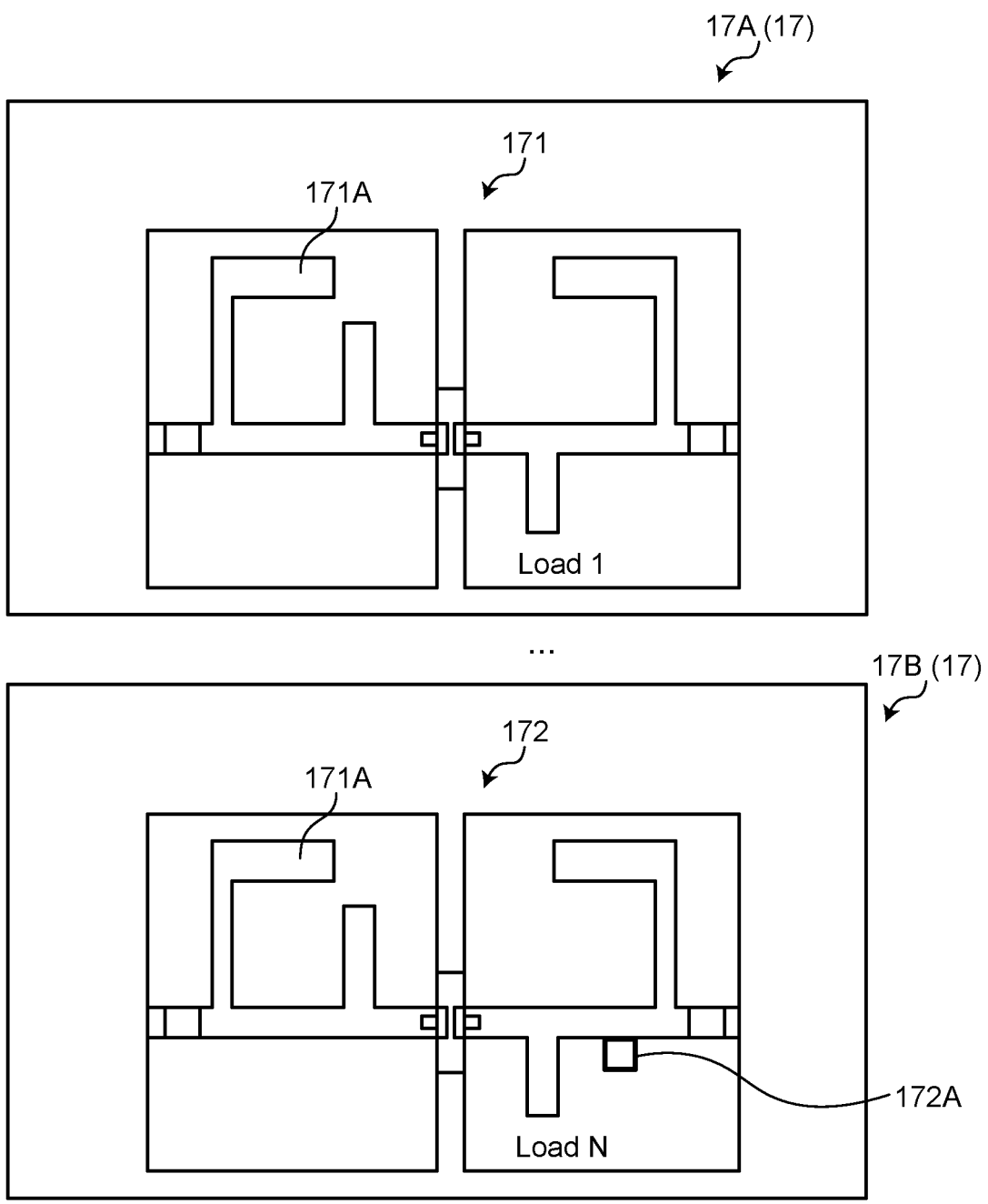
FIG. 3 is an explanatory diagram illustrating an example of the wiring configuration of an HPA.

FIG. 3 is an explanatory diagram illustrating an example of the wiring configuration of the HPA 17. The HPA 17 includes N/2 pieces of first HPAs 17A and N/2 pieces of second HPAs 17B. It is assumed that each Tx signal includes the first HPA 17A and the second HPA 17B. The first HPA 17A has a first load 171 formed with a wiring pattern 171A. The first HPA 17A outputs two Tx signals and two second IMD components to the first antenna element 18A, depending on the first load impedance of the first load 171 according to the supply of a predetermined current.

In contrast, the second HPA 17B has a second load 172 having the wiring pattern 171A, and a stub 172A connected to the wiring pattern 171A. Because the wiring pattern 171A of the first load 171 is commonly used, in the second HPA 17B, the second load impedance of the second load 172 is adjusted according to the supply of a predetermined current, by adjusting the load of the stub 172A. Then, the second HPA 17B outputs two Tx signals and two third IMD components to the second antenna element 18B, depending on the second load impedance of the second load 172 according to the supply of a predetermined current. The third IMD component is an IMD component the phase of which is opposite to that of the second IMD component.

Figure 4:
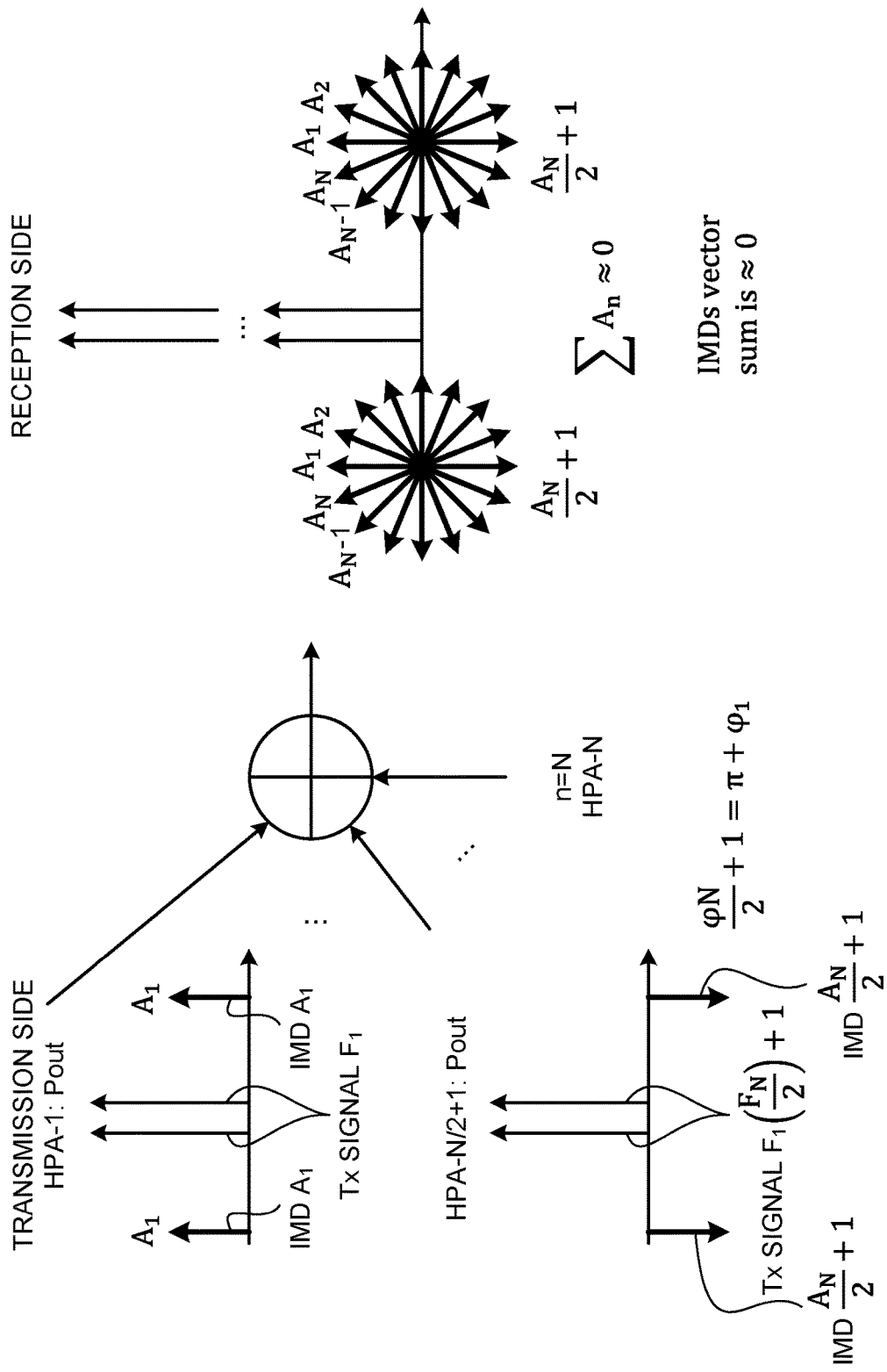
FIG. 4 is an explanatory diagram illustrating an example of a Tx signal and a second IMD component (third IMD component) in the HPA.

FIG. 4 is an explanatory diagram illustrating an example of a Tx signal and a second IMD component (third IMD component) in the HPA 17. The first HPA 17A outputs two Tx signals F 1 and two second IMD components $A_1$ to the first antenna element 18A, depending on the first load impedance of the first load 171 according to the supply of a predetermined current. The second HPA 17B corresponding to the first HPA 17A outputs two Tx signals $(F_N/2)+1$ and two third IMD components $(A_N/2)+1$ to the second antenna element 18B, depending on the second load impedance of the second load 172 according to the supply of a predetermined current. Then, the UE 4 on the receiving side receives the Tx signal F 1 and the second IMD component $A_1$ from the first antenna element 18A, and the Tx signal $(F_N/2)+1$ and the third IMD component $(A_N/2)+1$ from the second antenna element 18B. The Tx signal $F_1$ output from the first HPA 17A and the Tx signal $(F_N/2)+1$ output from the second HPA 17B have an in-phase relation. Therefore, the UE 4 will receive the Tx signal in which the vector sum of the Tx signal $F_1$ output from the first antenna element 18A corresponding to the first HPA 17A and the Tx signal $(F_N/2)+1$ output from the second antenna element 18B corresponding to the second HPA 17B is maximized.

In contrast, the second IMD component $A_1$ output from the first HPA 17A and the third IMD component $(A_N/2)+1$ output from the second HPA 17B have an opposite phase relation. Therefore, in the UE 4, the vector sum of the second IMD component $A_1$ output from the first HPA 17A and the third IMD component $(A_N/2)+1$ output from the second HPA 17B becomes zero. That is, in the UE 4, the second IMD component $A_1$ is canceled out by the third IMD component $(A_N/2)+1$.

The phase of the second IMD component $A_1$ of the individual first HPA 17A and the phase of the third IMD component $(A_N/2)+1$ of the individual second HPA 17B have an opposite phase relation. In the UE 4, the total vector sum of the second IMD component of the N/2 pieces of first HPA 17A and the third IMD component of the N/2 pieces of second HPA 17B becomes zero.

A method for adjusting the phase of the second IMD component (third IMD component) between the first HPA 17A and the second HPA 17B is $\Phi^*(N/2+n)=\Phi(n+n)$ (in this example, n=1, ..., N/2). By adjusting the phase of the third IMD component, the second IMD component of the first HPA 17A and the opposite-phase third IMD component of the second HPA 17B corresponding on the UE 4 side are combined, and cancels out the second IMD component.

The frequency band of the OFDM signal includes a band in the Tx signal band, a first band adjacent to the band, and a second band that is separated from the band and that is adjacent to the first band. The first band is a frequency band less than three times the band. The second band is a wide band ranging from the frequency band three times the band to the frequency band seven times or nine times the band.

Figure 5:
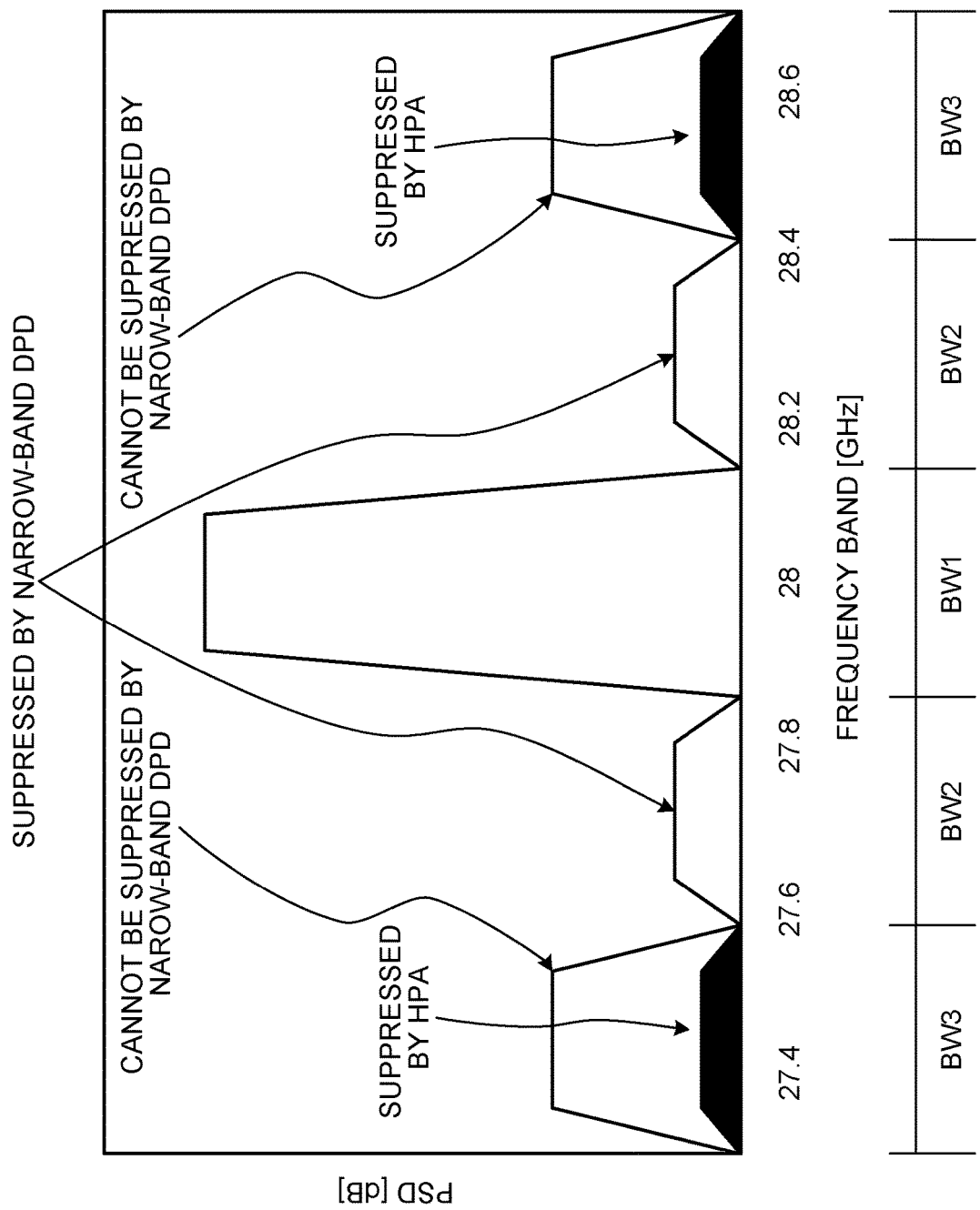
FIG. 5 is an explanatory diagram illustrating an example of the relation of PSD at each frequency band of an OFDM signal of the present embodiment.

FIG. 5 is an explanatory diagram illustrating an example of the relation of PSD at each frequency band of an OFDM signal of the present embodiment. The OFDM signal is a signal used in the 5G millimeter wave frequency band. The horizontal axis is a frequency band of the OFDM signal, and the vertical axis is the Power Spectrum Density (PSD). For example, the Tx signal with a bandwidth of 400 MHz in a band BW1 illustrated in FIG. 5 is an OFDM signal with the center frequency of 28 GHz. For example, the band BW1 of the Tx signal is a frequency band between 27.8 GHz and 28.2 GHz, and has a bandwidth of 400 MHz. For example, the first band BW2 is a frequency band between 27.6 GHz and 27.8 GHz, and between 28.2 GHz and 28.4 GHz. Moreover, for example, the second band BW3 is a frequency band between 27.3 GHz and 27.6 GHz, and between 28.4 GHz and 28.7 GHz. The IMD components are included in the wide bandwidth from 27.3 GHz to 28.7 GHz.

With the narrow-band DPD 12, although it is possible to suppress the first IMD component in the first band BW2 to an acceptable level, it is not possible to suppress the second IMD component in the second band BW3 to an acceptable level. Thus, with the second HPA 17B, by outputting the third IMD component, and canceling out the second IMD component received by the UE 4 on the reception side with the third IMD component, it is possible to suppress the second IMD component in the second band BW3 to an acceptable level, for example, to a zero level. As a result, for example, it is possible to suppress the IMD component to an acceptable level, in the entire frequency band of the OFDM signal between 27.3 GHz and 28.7 GHz.

In the UE 4, the spectrum component at a Tx signal frequency $f_0$ remains, while the second IMD component at an IMD frequency $f_{IMD}$ (that is, the second IMD component in the second band BW3) is only canceled out. That is, in the UE 4, it is possible to suppress the second IMD component to an acceptable level, by canceling out the second IMD component output from the first HPA 17A with the third IMD component output from the second HPA 17B. Because the second IMD component has the IMD frequency $f_{IMD}$ different from the Tx signal frequency $f_0$, the opposite-phase third IMD component is output by changing the second load impedance of the second load 172 in the second HPA 17B at the IMD frequency $f_{IMD}$. As a result, in the UE 4, it is possible to suppress the second IMD component according to the first load 171 of the first HPA 17A to an acceptable level, by using the third IMD component according to the second load 172.

Next, a method for adjusting the phase of the second IMD component (third IMD component) of each HPA 17 will be described in detail. The phase adjustment of the second IMD component is implemented by varying the load impedance $Z@(f_{IMD})$ at a predetermined IMD frequency $f_{IMD}$ by using the load-pull. In the UE 4, the Tx signals at the Tx signal frequency $f_0$ output from the first HPA 17A and the second HPA 17B need to be constructively combined. Thus, the load impedance $Z@(f_0)$ at the Tx signal frequency $f_0$ needs to be set substantially the same between the first load 171 of the first HPA 17A and the second load 172 of the second HPA 17B.

Figure 6:
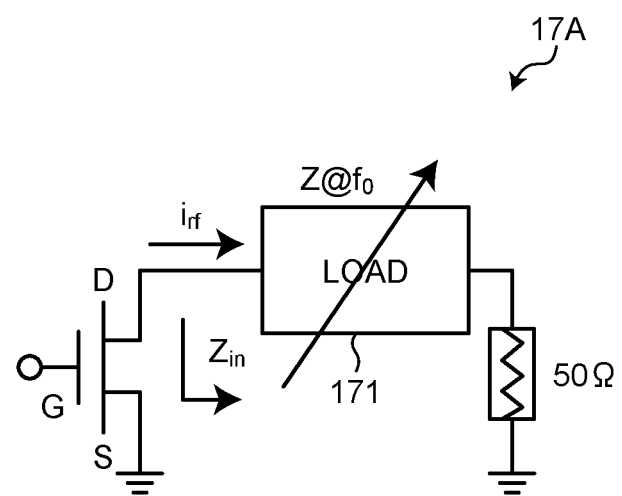
FIG. 6 is a diagram illustrating an example of an equivalent circuit of a first HPA when a load-pull is performed to select the load impedance at the Tx signal frequency.
Figure 7:
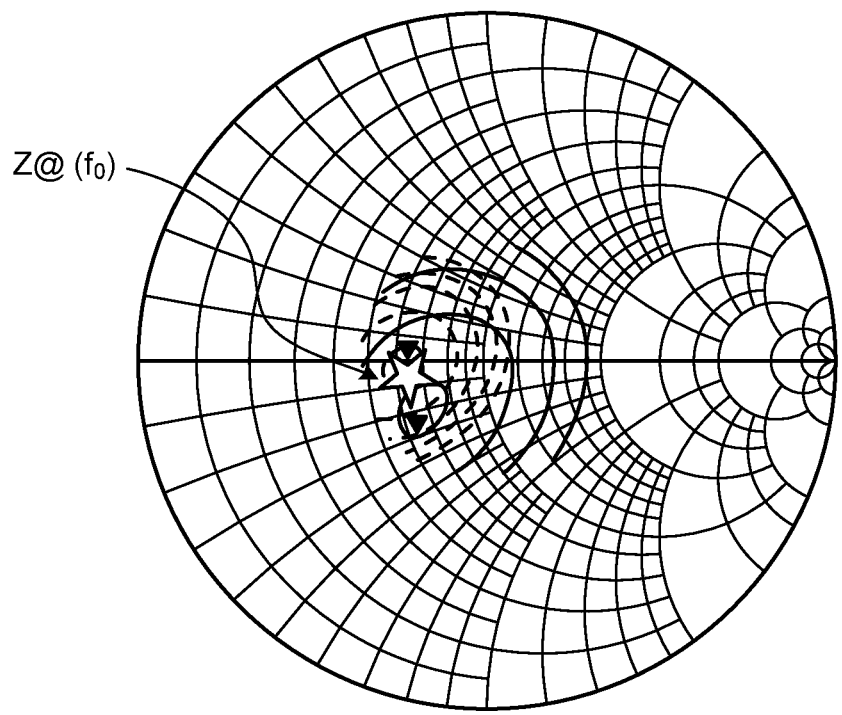
FIG. 7 is a Smith chart illustrating an example of the load-pull when the load impedance at the Tx signal frequency is selected.

FIG. 6 is a diagram illustrating an example of an equivalent circuit of the first HPA 17A when a load-pull is performed to select the load impedance at the Tx signal frequency. FIG. 7 is a Smith chart illustrating an example of the load-pull when the load impedance at the Tx signal frequency is selected. As illustrated in FIG. 6, the equivalent circuit of the first HPA 17A can be represented by a field effect transistor, a variable load, and a resistance of 50Ω. By performing a load-pull at the Tx signal frequency $f_0$, as illustrated in FIG. 7, the first load impedance $Z@(f_0)$ in the first HPA 17A can be obtained. That is, on the basis of the data results of the load-pull, the first load impedance $Z@(f_0)$ in the first HPA 17A for outputting the Tx signal and the second IMD component at a predetermined level at the Tx signal frequency $f_0$ is determined. For example, the predetermined level is the level at which the supply power and PAE are maximized. Then, the first HPA 17A selects the first load 171 that generates the first load impedance $Z@(f_0)$ corresponding to the predetermined current.

Figure 8:
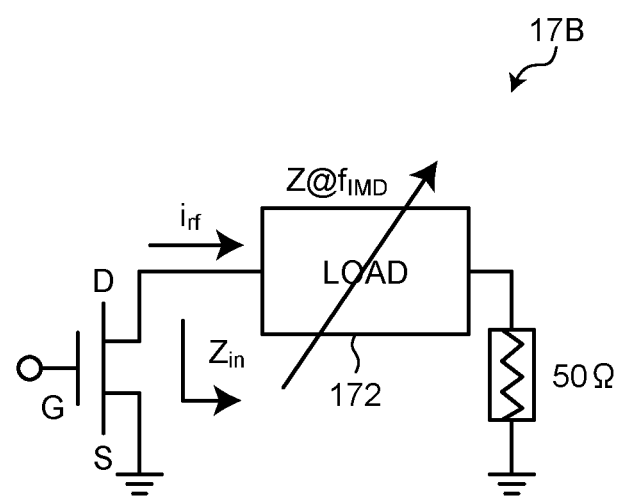
FIG. 8 is a diagram illustrating an example of an equivalent circuit of a second HPA when a load-pull is performed to select the load impedance at the IMD frequency.
Figure 9:
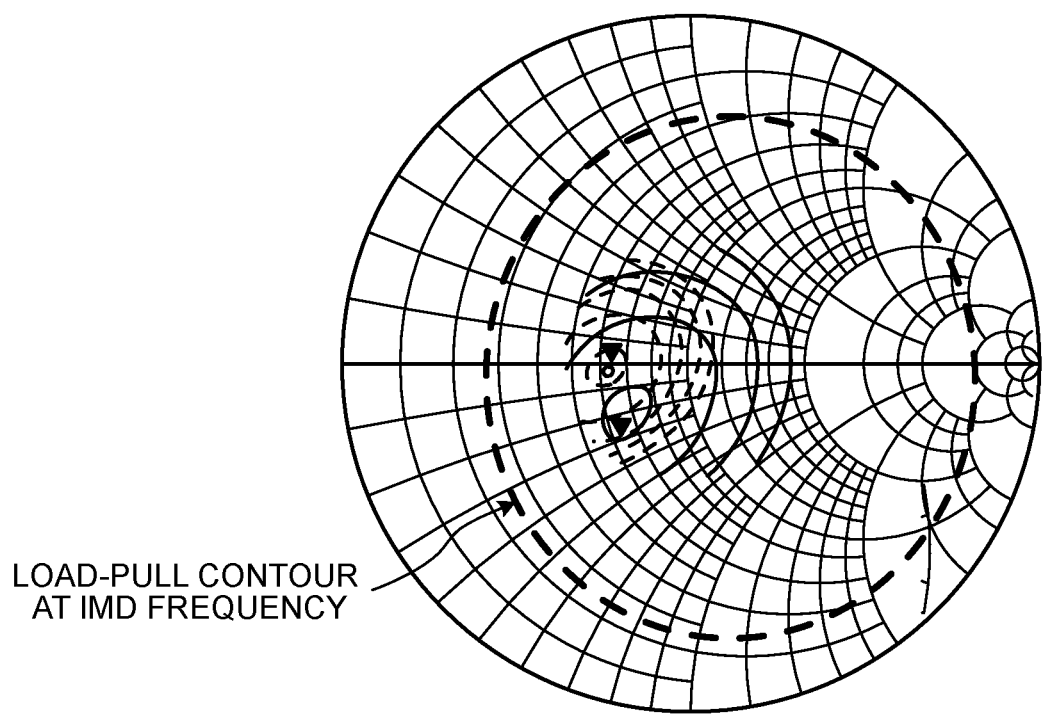
FIG. 9 is a Smith chart illustrating an example of the load-pull when the load impedance at the IMD frequency is selected.

FIG. 8 is a diagram illustrating an example of an equivalent circuit of the second HPA 17B when a load-pull is performed to select the load impedance at the IMD frequency. FIG. 9 is a Smith chart illustrating an example of the load-pull when the load impedance at the IMD frequency is selected. As illustrated in FIG. 8, the equivalent circuit of the second HPA 17B can be represented by a field effect transistor, a variable load, and a resistance of 50Ω. As illustrated in FIG. 9, by performing a load-pull at the IMD frequency $f_{IMD}$, the second load impedance $Z@(f_{IMD})$ in the second HPA 17B can be obtained. That is, on the basis of the data results of the load-pull, the load-pull contour at the IMD frequency $f_{IMD}$ that outputs the second IMD component at a predetermined level at the IMD frequency $f_{IMD}$ can be obtained.

Figure 10:
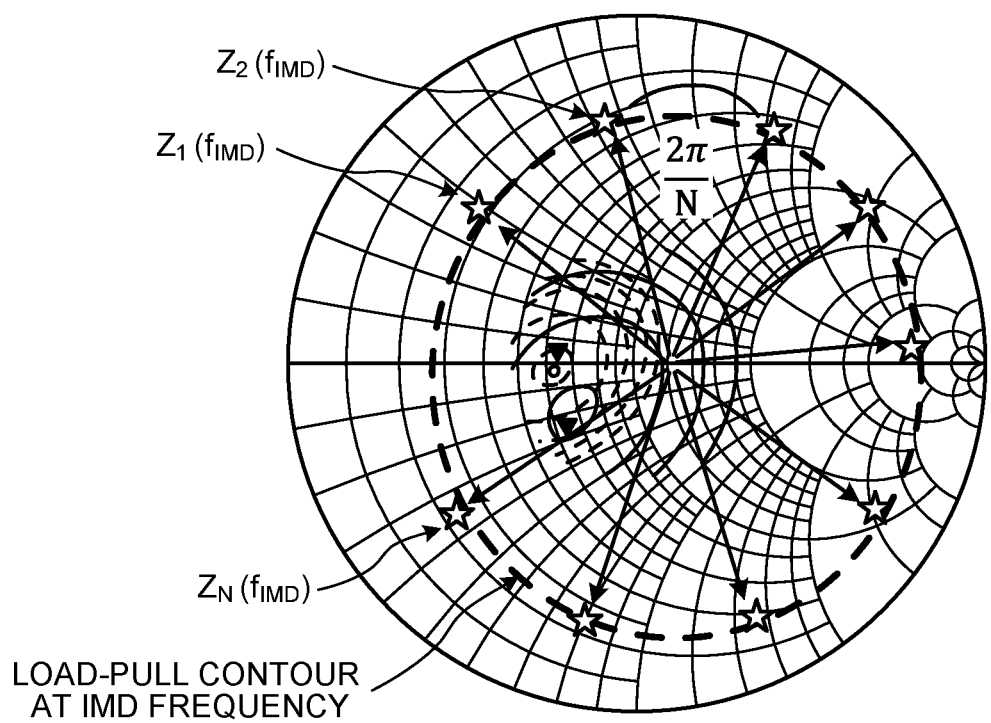
FIG. 10 is a Smith chart illustrating an example of a load-pull contour at the IMD frequency and the load impedance of each second HPA at the IMD frequency.

FIG. 10 is a Smith chart illustrating an example of the load-pull contour at the IMD frequency and the load impedance of each second HPA 17B at the IMD frequency. By disposing N pieces of equally spaced points (stars) on the load-pull contour at the IMD frequency $f_{IMD}$ illustrated in FIG. 10, N pieces of second load impedance $Z@(f_{IMD})$ at the IMD frequency $f_{IMD}$ will be selected. It is to be noted that @ is N. When the N pieces of second load impedance $Z@(f_{IMD})$ at the IMD frequency $f_{IMD}$ are taken into consideration, the phase Φ n at the IMD frequency $f_{IMD}$ is $n(2\pi/N)$. As a result, the second load impedance $Z@(f_{IMD})$ of the second HPA 17B for obtaining the third IMD component the phase of which is opposite to that of the second IMD component at a predetermined level output from the first HPA 17A is determined. The second HPA 17B selects the second load 172 at which the second load impedance $Z@(f_{IMD})$ is generated corresponding to the predetermined current.

Figure 11:
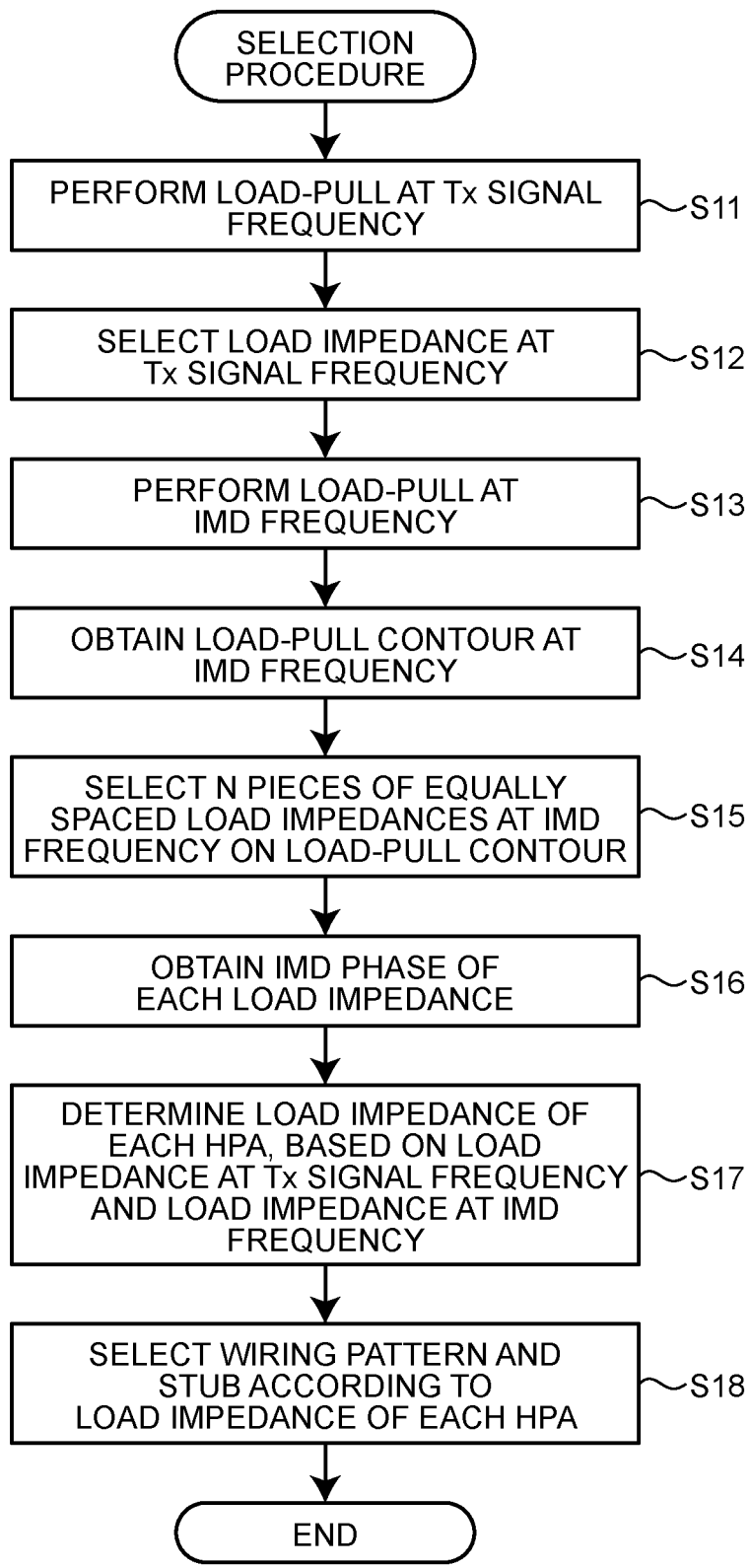
FIG. 11 is a flowchart illustrating an example of a selection procedure.
Figure 12:
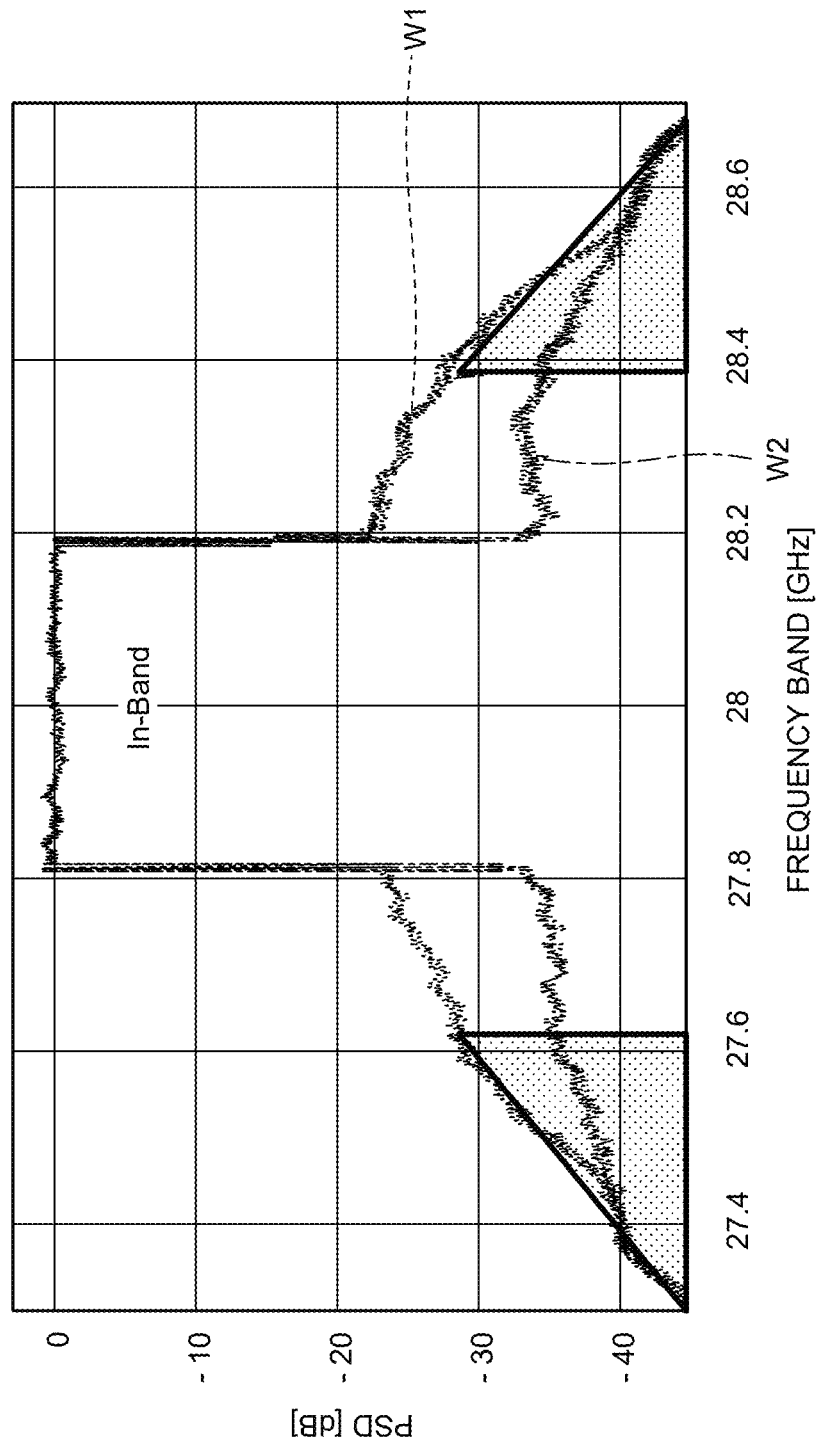
FIG. 12 is an explanatory diagram illustrating an example of PSD at each frequency band of an OFDM signal when a wide-band DPD is used.
Figure 13:
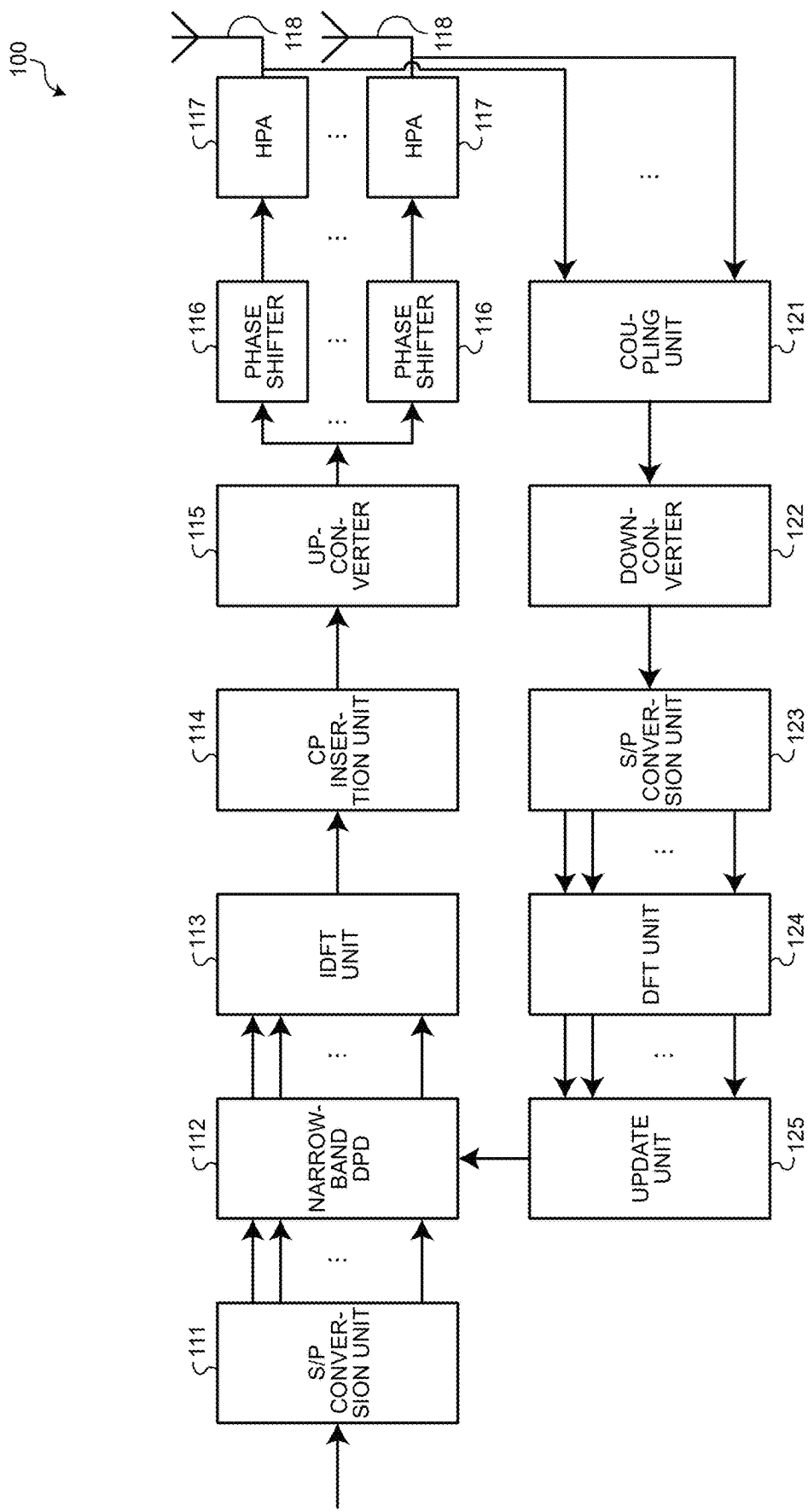
FIG. 13 is an explanatory diagram illustrating an example of an array antenna system.
Figure 14:
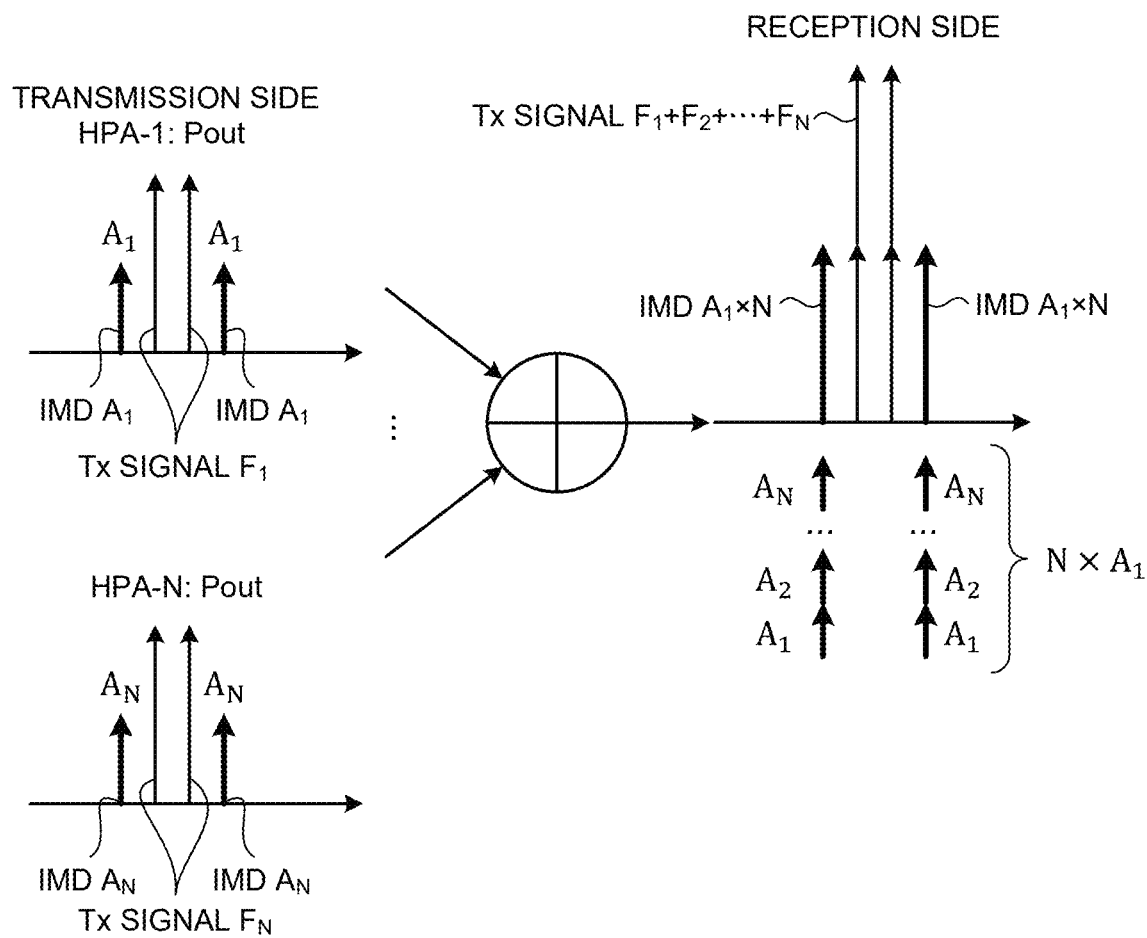
FIG. 14 is an explanatory diagram illustrating an example of a Tx signal and a second IMD component (third IMD component) in the HPA.
Figure 15:
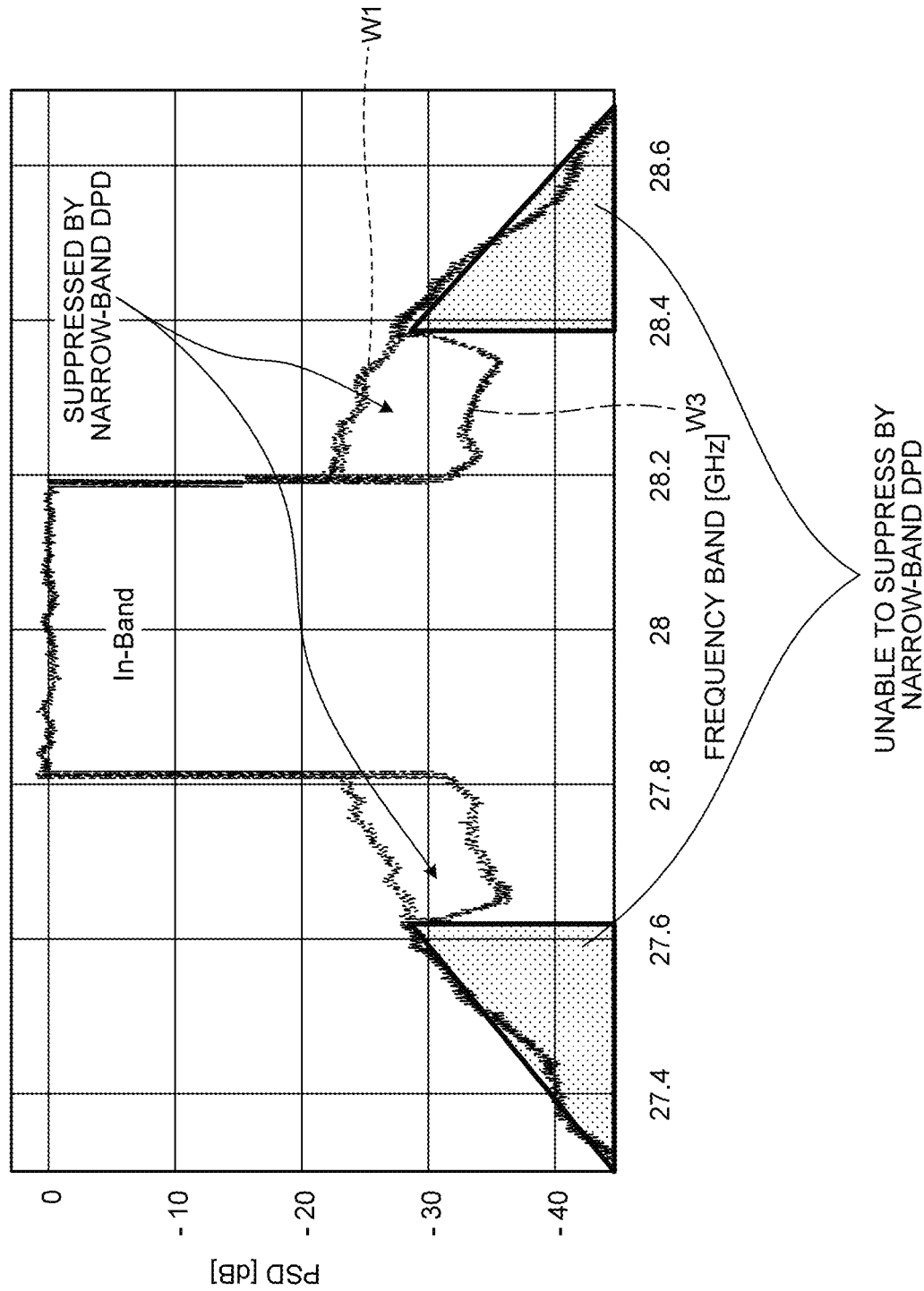
FIG. 15 is an explanatory diagram illustrating an example of PSD at each frequency band of an OFDM signal when a narrow-band DPD is used.
Figure 16:
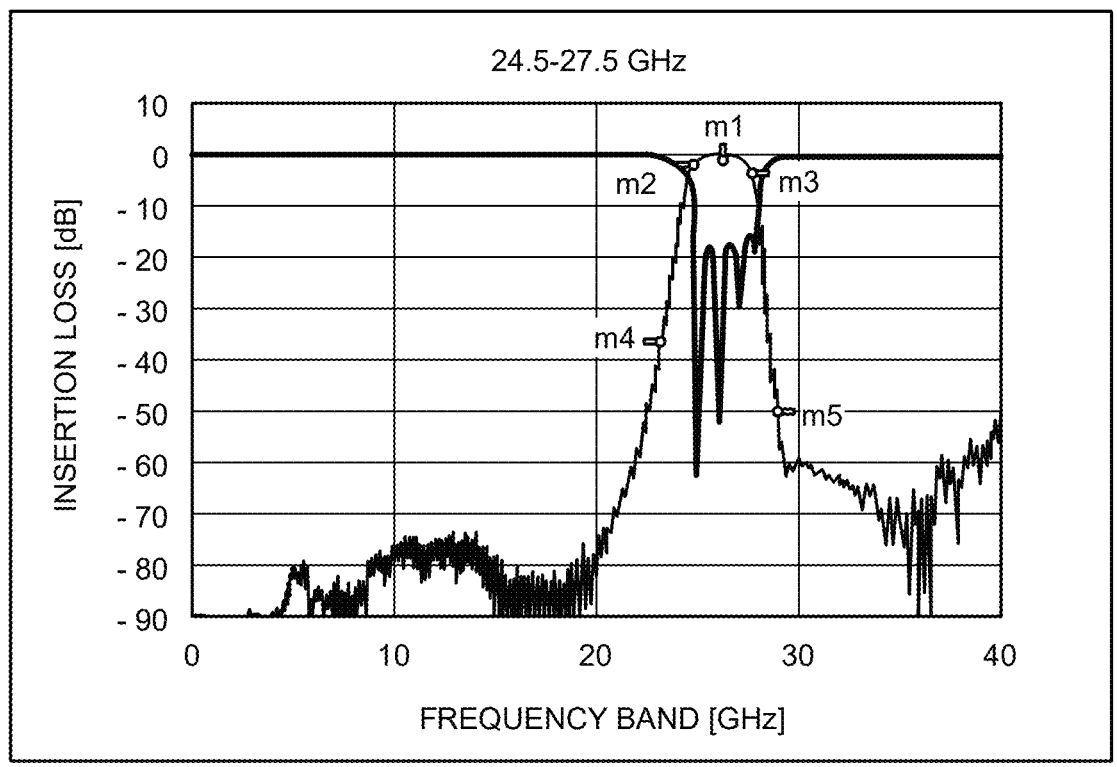
FIG. 16 is an explanatory diagram illustrating an example of the insertion loss of a BPF at each frequency band of a Tx signal.

FIG. 11 is a flowchart illustrating an example of a selection procedure. The selection procedure illustrated in FIG. 11 is a procedure for selecting the first load 171 and the second load 172 to be used in each HPA 17. As the selection procedure, a load-pull is performed at the Tx signal frequency $f_0$ (step S11). As the selection procedure, after performing the load-pull at the Tx signal frequency $f_0$, on the basis of the data results of the load-pull at the Tx signal frequency $f_0$, the first load impedance at the Tx signal frequency $f_0$ corresponding to the predetermined current will be selected as illustrated in FIG. 7 (step S12). As a result, the first load 171 depending on the first load impedance at the Tx signal frequency $f_0$ will be selected. It is to be noted that the first load 171 is the common load of the HPAs 17.

Moreover, as the selection procedure, a load-pull is performed at the IMD frequency $f_{IMD}$ (step S13). As the selection procedure, after performing the load-pull at the IMD frequency $f_{IMD}$, on the basis of the data results of the load-pull at the IMD frequency $f_{IMD}$, as illustrated in FIG. 9, the load-pull contour at the IMD frequency $f_{IMD}$ is obtained (step S14). Furthermore, as the selection procedure, N pieces of equally spaced second load impedance are selected from the load-pull contour at the IMD frequency $f_{IMD}$ (step S15).

Still furthermore, as the selection procedure, as illustrated in FIG. 10, the phases of the N pieces of IMD frequencies $f_{IMD}$ are obtained from the N pieces of equally spaced second load impedance (step S16). That is, the second load impedance corresponding to the IMD frequency $f_{IMD}$ of the second IMD component and the second load impedance corresponding to the IMD frequency $f_{IMD}$ of the third IMD component the phase of which is opposite to that of the second IMD component are determined. Still furthermore, as the selection procedure, the load impedance of each HPA 17 is determined, on the basis of the load impedance at the Tx signal frequency $f_0$ and the load impedance at the IMD frequency $f_{IMD}$ (step S17).

Then, as the selection procedure, the wiring pattern 171A and the stub 172A are determined depending on the load impedance of each HPA 17 (step S18), and the procedure is terminated. As a result, the first HPA 17A with the first load 171 depending on the first load impedance is prepared to obtain the second IMD component and the Tx signal frequency $f_0$. Moreover, the second HPA 17B with the second load 172 depending on the second load impedance is prepared to obtain the opposite-phase third IMD component for canceling out the second IMD component and the Tx signal frequency $f_0$.

As a result, the first HPA 17A outputs the Tx signal and the second IMD component from the first antenna element 18A. Moreover, the second HPA 17B outputs the Tx signal output from the first HPA 17A, and the third IMD component the phase of which is opposite to that of the second IMD component output from the first HPA 17A, from the second antenna element 18B.

With the array antenna system 3A in the present embodiment, it is possible to suppress the first IMD component in the first band BW2 to an acceptable level by using the narrow-band DPD 12, and suppress the second IMD component in the second band BW3 to an acceptable level by using the HPA 17. Also, compared to using the conventional wide-band DPD, the array antenna system 3A in the present embodiment can significantly reduce the power consumption. Moreover, with the array antenna system 3A in the present embodiment, it is possible to suppress the second IMD component in the second band BW3 to an acceptable level without using a BPF.

Also, the first HPA 17A outputs the Tx signal and the second IMD component from the first antenna element 18A, while the second HPA 17B outputs the Tx signal and the third IMD component from the second antenna element 18B. Then, the UE 4 can increase the strength of the useful Tx signal, by receiving the Tx signal from the first antenna element 18A and the Tx signal from the second antenna element 18B, and by coherently combining the received Tx signals. The UE 4 receives the second IMD component from the first antenna element 18A and the third IMD component from the second antenna element 18B, and cancels out the received second IMD component with the third IMD component. As a result, by suppressing the second IMD component in the wide band, it is possible to prevent the second IMD component from interfering with the level of the Tx signals of other carriers. Hence, it is possible to improve the throughput of the entire wireless system 1.

The first HPA 17A has the first load 171 having the first load impedance with which the Tx signal directed to a predetermined direction and the second IMD component are amplified and output corresponding to the predetermined current. The second HPA 17B has the second load 172 having the second load impedance different from the first load impedance with which the Tx signal directed to a predetermined direction and the third IMD component are amplified and output corresponding to the predetermined current. As a result, by changing the load impedance, it is possible to output the opposite-phase third IMD component.

The first load 171 has the wiring pattern 171A having the first load impedance corresponding to the predetermined current. The second load 172 has the wiring pattern 171A, the stub 172A connected to the wiring pattern 171A, and the second load impedance corresponding to the predetermined current. As a result, it is possible to output the opposite-phase third IMD component, by adjusting the stub 172A connected to the wiring pattern 171A.

In the example of the second HPA 17B, to cancel out the second IMD component output from the first HPA 17A on the UE 4 side, the stub 172A connected to a normal wiring pattern 171A is adjusted so that the load impedance at which the opposite-phase third IMD component is output is obtained. However, the second IMD component does not have to be completely canceled out. The load impedance of the second load 172 may be appropriately changed to generate the third IMD component that reduces the second IMD component to an acceptable level, on the UE 4 side.

In the example, the load impedance is adjusted such that the first load 171 outputs the second IMD component at a predetermined level, and the second load 172 outputs the opposite-phase third IMD component that cancels out the second IMD component on the UE 4 side. However, an object to be adjusted is not limited to the load impedance, and may be appropriately changed to a reflection coefficient. For example, the first load 171 may have a first reflection coefficient with which the vector sum of the Tx signals directed to a predetermined direction is maximized, and the second load 172 may have a second reflection coefficient with which the vector sum of the IMD components in the second band BW3 is reduced. For example, a reflection coefficient Γ can be represented by $(Z-Z_0)/(Z+Z_0)$. Z is the load impedance of the HPA 17, and $Z_0$ is the target impedance of 50Ω, for example, $(50+j\cdot 0)$Ω.

The first HPA 17A outputs the Tx signal and the second IMD component from the first antenna element 18A, by using the first load 171 with a first reflection coefficient. Moreover, by using the second load 172 with a second reflection coefficient, the second HPA 17B outputs the Tx signal and the third IMD component from the second antenna element 18B. Then, the UE 4 can increase the strength of the useful Tx signal, by receiving the Tx signal from the first antenna element 18A and the Tx signal from the second antenna element 18B, and by coherently combining the received Tx signals. The UE 4 receives the second IMD component from the first antenna element 18A and the third IMD component from the second antenna element 18B, and cancels out the received second IMD component with the third IMD component. As a result, by suppressing the second IMD component in the wide band using the third IMD component, and by preventing the second IMD component from interfering with the level of the Tx signals of other carriers, it is possible to improve the throughput of the entire wireless system 1.

Moreover, the components of the units illustrated in the drawings do not have to be physically configured as illustrated in the drawings. That is, the specific forms of dispersion and integration of the units are not limited to those illustrated in the drawings, and all or part of the units may be dispersed or integrated functionally or physically in optional units according to various types of loads, use conditions, or the like.

Figure 17:
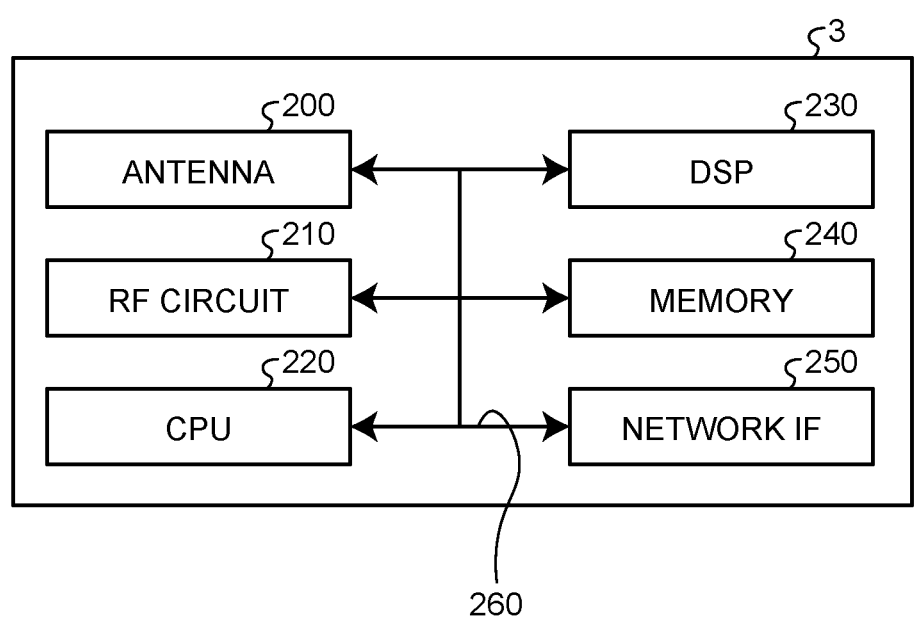
FIG. 17 is an explanatory diagram illustrating an example of a hardware configuration of the RU.

A hardware configuration of the RU 3 that adopts the present embodiment will be described below. FIG. 17 is an explanatory diagram illustrating an example of a hardware configuration of the RU 3. As illustrated in FIG. 17, as hardware components, for example, the RU 3 includes a Radio Frequency (RF) circuit 210 with an antenna 200, a Central Processing Unit (CPU) 220, a Digital Signal Processor (DSP) 230, a memory 240, and a network Interface (IF) 250. The CPU 220 is connected so that various signals and data signals can be input and output via the bus 260. For example, the memory 240 includes at least one of a Random Access Memory (RAM) such as a Synchronous Dynamic Random Access Memory (SDRAM), a Read Only Memory (ROM), and a flash memory, and stores a computer program for controlling the processing of the RU 3 and the like.

For example, the array antenna system 3A illustrated in FIG. 2 is implemented by the antenna 200, the RF circuit 210, the CPU 220, and the DSP 230. For example, in the array antenna system 3A, the digital processing is performed by the DSP 230, and the wireless signal processing is performed by the RF circuit 210. Moreover, for example, the operation of the array antenna system 3A is controlled by the CPU 220.

Furthermore, for example, the network IF 250 is used to transmit and receive signals from the CU/DU 2 and the like.

According to an aspect, it is possible to suppress the nonlinear distortion in a wide band.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An array antenna system, comprising:
   Digital Predistortion (DPD) that suppresses a first nonlinear distortion in a first band adjacent to a band of a first transmission signal;
   a plurality of antenna elements that include a first antenna element and a second antenna element;
   a plurality of phase shifters that each corresponds to each of the plurality of antenna elements, and that forms a second transmission signal directed to a predetermined direction by applying a weight to the first transmission signal;
   a plurality of amplifiers that forms the first nonlinear distortion in the first band and a second nonlinear distortion in a second band that is separated from the band of the first transmission signal that is adjacent to the first band;
   a first amplifier in the plurality of the amplifiers, that amplifies the second transmission signal directed to the predetermined direction and generates a first distortion serving as the second nonlinear distortion, and that outputs the second transmission signal and the first distortion to the first antenna element corresponding to a first phase shifter of the plurality of phase shifters; and
   a second amplifier in the plurality of the amplifiers, that amplifies the second transmission signal directed to the predetermined direction and generates a second distortion so that a phase of the second nonlinear distortion of the second amplifier is opposite to a phase of the second nonlinear distortion of the first amplifier, and that outputs the second transmission signal and the second distortion to the second antenna element corresponding to a second phase shifter of the plurality of phase shifters, the second amplifier generating the second distortion so as to reduce the second nonlinear distortion on a receiver side that receives the second transmission signal and the second nonlinear distortion from the first antenna element, and outputting the second transmission signal and the second distortion from the second antenna element.

2. The array antenna system according to claim 1, wherein the second amplifier generates the second distortion so as to cancel out the second nonlinear distortion on the receiver side that receives the second transmission signal and the second nonlinear distortion from the first antenna element, and outputs the second transmission signal and the second distortion from the second antenna element.

3. The array antenna system according to claim 1, wherein the first amplifier has a first load having a first load impedance with which the second transmission signal directed to the predetermined direction and the first distortion is generated corresponding to a first predetermined current and an output of the first antenna element, and
   the second amplifier has a second load having a second load impedance different from the first load impedance with which the second transmission signal directed to the predetermined direction and the second distortion is generated corresponding to a second predetermined current and an output of the second antenna element.

4. The array antenna system according to claim 3, wherein the first load has a wiring pattern having the first load impedance corresponding to the first predetermined current, and
   the second load has the wiring pattern, a stub connected to the wiring pattern, and the second load impedance corresponding to the second predetermined current.

5. The array antenna system according to claim 1, wherein the first amplifier has a first load having a first reflection coefficient with which the second transmission signal directed to the predetermined direction and the first distortion is generated corresponding to a first predetermined current and an output of the first antenna element, and
   the second amplifier has a second load having a second reflection coefficient different from the first reflection coefficient with which the second transmission signal directed to the predetermined direction and the second distortion is generated corresponding to a second predetermined current and an output of the second antenna element.

6. A nonlinear distortion suppression method comprising:
   suppressing a first nonlinear distortion in a first band adjacent to a band of a first transmission signal;
   forming, by a plurality of phase shifters at each of a plurality of antenna elements including a first antenna element and a second antenna element, a second transmission signal directed to a predetermined direction by applying a weight to the first transmission signal;
   forming, by a plurality of amplifiers, the first nonlinear distortion in the first band and a second nonlinear distortion in a second band that is separated from the band of the first transmission signal that is adjacent to the first band;
   amplifying, by a first amplifier in the plurality of the amplifiers, the second transmission signal directed to the predetermined direction and generating a first distortion serving as the second nonlinear distortion and outputting the second transmission signal and the first distortion to the first antenna element corresponding to a first phase shifter of the plurality of phase shifters; and
   amplifying, by a second amplifier in the plurality of the amplifiers, the second transmission signal directed to the predetermined direction and generating a second distortion so that a phase of the second nonlinear distortion of the second amplifier is opposite to a phase of the second nonlinear distortion of the first amplifier and outputting the second transmission signal and the second distortion to the second antenna element corresponding to a second phase shifter of the plurality of phase shifters, the second amplifier generating the second distortion so as to reduce the second nonlinear distortion on a receiver side that receives the second transmission signal and the second nonlinear distortion from the first antenna element, and outputting the second transmission signal and the second distortion from the second antenna element.

* * * * *